United States Patent
Allen et al.

(10) Patent No.: US 10,559,317 B2
(45) Date of Patent: Feb. 11, 2020

(54) MICROPHONE ARRAY PROCESSING FOR ADAPTIVE ECHO CONTROL

(71) Applicant: Cirrus Logic International Semiconductor Ltd., Edinburgh (GB)

(72) Inventors: Justin L. Allen, Mesa, AZ (US); Narayan Kovvali, Tempe, AZ (US)

(73) Assignee: Cirrus Logic International Semiconductor Ltd., Edinburgh (GB)

( * ) Notice: Subject to any disclaimer, the term of this patent is extended or adjusted under 35 U.S.C. 154(b) by 11 days.

(21) Appl. No.: 16/024,618

(22) Filed: Jun. 29, 2018

(65) Prior Publication Data

US 2020/0005807 A1 Jan. 2, 2020

(51) Int. Cl.
  *G10L 21/0232* (2013.01)
  *H04R 3/00* (2006.01)
  *H04R 1/40* (2006.01)
  *G10L 25/78* (2013.01)
  *G10L 21/0208* (2013.01)

(52) U.S. Cl.
  CPC .......... *G10L 21/0232* (2013.01); *G10L 25/78* (2013.01); *H04R 1/406* (2013.01); *H04R 3/005* (2013.01); *G10L 2021/02082* (2013.01)

(58) Field of Classification Search
  CPC .............. G10L 21/0232; G10L 25/78; G10L 2021/02082; H04R 3/005; H04R 1/406
  USPC .......................... 381/66, 71.1, 94.1, 71.2, 95
  See application file for complete search history.

(56) References Cited

U.S. PATENT DOCUMENTS

| | | | |
|---|---|---|---|
| 2003/0123674 A1* | 7/2003 | Boland | H04M 9/082 |
| | | | 381/66 |
| 2006/0250998 A1 | 11/2006 | Beaucoup et al. | |
| 2007/0021958 A1 | 1/2007 | Visser et al. | |
| 2014/0056435 A1 | 2/2014 | Kjems et al. | |
| 2014/0286497 A1* | 9/2014 | Thyssen | H04R 3/005 |
| | | | 381/66 |

OTHER PUBLICATIONS

Guo et al., "Acoustic Feedback and Echo Cancellation Strategies for Multiple-Microphone and Single-Lou," dspeaker Systems, 2011 IEEE, pp. 556-560. 5 pages.

(Continued)

*Primary Examiner* — Thjuan K Addy
(74) *Attorney, Agent, or Firm* — Duane Morris LLP (57) ABSTRACT

An apparatus includes a beamformer, an echo suppression control unit, and a residual echo cancellation unit. The beamformer is configured to pass desired portions of audio signals and to suppress undesired portions of the audio signals. The beamformer includes a speech blocking filter to prevent suppression of near-end desired talker speech in the audio signals and an echo suppression filter to suppress echo in the audio signals. An echo suppression control unit is coupled to the beamformer and receives signals and determines whether to dynamically adapt the speech blocking filter or to dynamically adapt the echo suppression filter. The speech blocking filter remains unchanged during dynamic adaptation of the echo suppression filter, and the echo suppression filter remains unchanged during dynamic adaptation of the speech blocking filter. The residual echo cancellation unit is coupled to the beamformer and receives output audio signals from the beamformer and further suppresses residual echo.

22 Claims, 8 Drawing Sheets

(56) References Cited

OTHER PUBLICATIONS

Herbordt et al., "Joint Optimization of LCMV Beamforming and Acoustic Echo Cancellation for Automatic Speech Recognition," 2005 IEEE, pp. III-77-III-80. 4 pages.

Kellermann, Walter, "Strategies for Combining Acoustic Echo Cancellation and Adaptive Beamforming Microphone Arrays," 1997 IEEE, pp. 219-222. 4 pages.

Le Bouquin Jeannes et al., "Combined Noise and Echo Reduction in Hands-Free Systems: A Survey," Nov. 2001, IEEE Transactions on Speech and Audio Processing, vol. 9, No. 8, pp. 808-820. 13 pages.

Reuven et al., "Joint Acoustic Echo Cancellation and Transfer Function GSC in the Frequency Domain," 2004 IEEE, pp. 412-415. 4 pages.

Canadian Intellectual Property Office, International Search Report for PCT/CA2019/050911, dated Jul. 2, 2019, Quebec, Canada.

* cited by examiner

MICROPHONE ARRAY PROCESSING FOR ADAPTIVE ECHO CONTROL

BACKGROUND

Expansive use of smart devices with audio input/output capability, e.g., speech recognition, voice communication, etc., has increased the need to improve audio quality. The quality of recorded speech signals from a desired talker of interest may be adversely affected by the presence of interfering signals such as noise and echo. For example, sound from a loudspeaker may reflect back to a microphone, producing an echo. As a result, audio devices may include acoustic echo cancelers (AECs), for reducing such echoes. AECs exploit knowledge of the loudspeaker playback signal to cancel the echo in the microphone recording. In some systems, echo may be controlled and reduced with a reference loudspeaker playback signal that cancels the echo on each input channel (e.g., microphone input signals) by reducing the power of the echo signal at the processed output using linear filtering.

Unfortunately, most audio transducers, e.g., microphones, loudspeakers, power amplifiers, etc., are nonlinear, resulting in reduced performance of linear AECs. For example, small loudspeakers and poorly designed enclosures may lead to nonlinear echoes that are not addressed by traditional AECs. As such, these systems are not suited for reducing nonlinear echo signals. In some conventional echo and noise reduction systems, a set of AECs may be utilized to reduce echo signals at the input to a beamformer, and the beamformer is used to reduce noise. Unfortunately, any additional (residual) echo is not canceled by the beamformer, because the beamformer is used to reduce noise and not echo.

SUMMARY

In accordance with the teachings of the present disclosure, the disadvantages and problems associated with audio transducer nonlinearities in performing echo cancellation in an audio device have been reduced or eliminated.

In some embodiments, an apparatus includes a beamformer, an echo suppression control unit, and an echo cancellation unit. The beamformer is configured to pass desired portions of audio signals (near-end talker speech) and to suppress undesired portions of the audio signals (echo). The beamformer may include a speech blocking filter to suppress speech from the audio signals and may further include an echo suppression filter to suppress echo from the audio signals. The echo suppression control unit is coupled to the beamformer. The echo suppression control unit is configured to receive a signal and determine whether to dynamically adapt the speech blocking filter or to dynamically adapt the echo suppression filter. The speech blocking filter remains unchanged during dynamic adaptation of the echo suppression filter and the echo suppression filter remains unchanged during dynamic adaptation of the speech blocking filter. The echo cancellation unit is coupled to the beamformer. The echo cancellation unit is configured to receive output audio signals from the beamformer. The echo cancellation unit is further configured to suppress residual echo of the output audio signals.

It is appreciated that in some embodiments the apparatus may further include a persistence interference detector configured to receive the audio signals and to detect presence of persistence interference sources (noise or echo sources that are spatially stationary with respect to the microphone array). The persistence interference detector is configured to generate the signal indicating whether persistence interference sources exist. The signal is input to the echo suppression control unit that determines whether to dynamically adapt the echo suppression filter responsive to the signal. In some embodiments, the signal is an output signal from the echo cancellation unit.

In some embodiments, the apparatus further includes a plurality of acoustic echo cancelers (AECs) coupled to an input of the beamformer. The plurality of AECs is configured to reduce echo of the audio signals at the input of the beamformer by reducing the power thereof using linear filtering. In some embodiments, the echo suppression control unit is configured to maintain the echo suppression filter unchanged during startup of the apparatus. It is appreciated, at startup, the plurality of AECs adapts rapidly. The echo suppression control unit may further be configured to cause the beamformer to dynamically adapt the speech blocking filter during the startup of the apparatus if near speech is detected.

According to some embodiments, the echo suppression control unit is configured to maintain the echo suppression filter unchanged in response to detecting a trigger word from a desired talker. In one embodiment, the echo suppression control unit is configured to cause the echo suppression filter to dynamically adapt in response to detecting that the received audio signals are comprised predominantly of an echo and further in response to detecting that loudspeaker playback is active. In some embodiments, the echo suppression control unit is configured to cause the beamformer to dynamically adapt the speech blocking filter in response to detecting near speech.

In some embodiments, an apparatus includes a processor and an echo suppression control unit. The processor may include a first filter and a second filter. The processor is configured to receive audio signals from one or more microphones and to suppress undesired (echo) portions of the audio signals and to pass desired portions of the audio signals (near-end talker speech). In some embodiments, the echo suppression control unit is configured to receive a signal and determine whether to dynamically adapt the second filter to suppress echo from the received audio signals. It is appreciated that the second filter remains unchanged during dynamic adaptation of the first filter and that the first filter remains unchanged during dynamic adaptation of the second filter.

It is appreciated that in some embodiments, the first filter is dynamically adapted to block speech from the received audio signals. According to one embodiment, the first filter may an adaptive blocking matrix and the second filter may be a side lobe canceler.

In some embodiments, the apparatus includes a plurality of acoustic echo cancelers (AECs) coupled to the inputs of the processor. The plurality of AECs is configured to reduce echo of the audio signals at the input of the processor by reducing the power thereof. The echo suppression control unit may be configured to maintain the second filter unchanged during startup of the apparatus. The plurality of AECs adapts rapidly during the startup. The echo suppression control unit may be configured to cause the processor to dynamically adapt the first filter during the startup of the apparatus if near speech is detected.

In some embodiments, the echo suppression control unit may be configured to maintain the second filter unchanged in response to detecting a trigger word from the desired talker. According to one embodiment, the echo suppression control unit is configured to cause the second filter of the processor to dynamically adapt in response to detecting that the received audio signals comprise predominantly of an echo and further in response to detecting that loudspeaker playback is active. It is appreciated that in some embodiments, the echo suppression control unit may be configured to cause the processor to dynamically adapt the first filter in response to detecting near speech.

In some embodiments, a method includes receiving audio signals, determining whether near speech is present, and determining whether the audio signals are comprised predominantly of echo. The method may further dynamically adapting a speech blocking filter in response to determining presence of the near speech. Responsive to determining presence of predominantly echo, an echo suppression filter may dynamically be adapted. It is appreciated that the speech blocking filter remains unchanged during adaptation of the echo suppression filter and that the echo suppression filter remains unchanged during adaptation of speech blocking filter.

According to one embodiment, the method may further include determining whether persistence interference is present and in response to determining that persistence interference is present dynamically adapting the echo suppression filter.

It is appreciated that in some embodiments, the method further includes maintaining the echo suppression filter unchanged responsive to detecting rapid adaptation of the acoustic echo cancelers during startup and responsive to the maintaining and further responsive to determining presence of near speech, dynamically adapting the speech blocking filter.

In some embodiments, the method may further include maintaining the echo suppression filter unchanged in response to detecting a trigger word. It is appreciated that in some embodiments, the method may further include dynamically adapting the echo suppression filter in response to detecting that the received audio signals comprise an echo dominating portion and further responsive to detecting that playback is active. In one embodiment, the method may further include dynamically adapting the speech blocking filter in response to detecting near speech and further in response to detecting presence of near speech dominating portion in the received audio signals.

These and other features and aspects of the concepts described herein may be better understood with reference to the following drawings, description, and appended claims.

DETAILED DESCRIPTION

Before various embodiments are described in greater detail, it should be understood by persons having ordinary skill in the art that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art that the terminology used herein is for the purpose of describing the certain concepts, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "forward," "reverse," "clockwise," "counter clockwise," "up," "down," or other similar terms such as "upper," "lower," "above," "below," "vertical," "horizontal," "proximal," "distal," "spatial," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the embodiments pertain.

A need has arisen to adaptively control a beamformer of an apparatus for echo suppression, where the beamformer is traditionally used to suppress noise.

Electronic devices with audio capabilities, e.g., automatic speech recognition, audio processing, audio playback, smart home automation, etc., may benefit from the audio processing described herein. The algorithms performing the audio processing may be integrated in hardware components of the electronic devices or programmed as software or firmware to execute on the hardware components of the electronic device. The hardware components may include processors or other components with logic units configured to execute instructions. The programming of instructions to be executed by the processor can be accomplished in various manners known to those of ordinary skill in the art. Additionally or alternatively to integrated circuits comprising logic units, the integrated circuits may be configured to perform the described audio processing through discrete components, such as transistors, resistors, capacitors, and inductors. Such discrete components may be configured in various arrangements to perform the functions described herein. The arrangement of discrete components to perform these functions can be accomplished by those of ordinary skill in the art. Furthermore, discrete components can be combined with programmable components to perform the audio processing. For example, an analog-to-digital converter (ADC) may be coupled to a digital signal processor (DSP), in which the ADC performs some audio processing and the DSP performs some audio processing. The ADC may be used to convert an analog signal, such as a microphone signal, to a digital representation of sounds in a room.

The DSP may receive the digital signal output from the ADC and perform mathematical operations on the digital representation to identify and/or extract certain sounds in the room. Such a circuit including analog domain components and digital domain components may be referred to as a mixed signal circuit, wherein "mixed" refers to the mixing of analog and digital processing.

In some embodiments, the mixed signal circuit may be integrated as a single integrated circuit (IC). The IC may be referred to as an audio controller or audio processor because the IC is configured to process audio signals as described herein and is configured to provide additional functionality relating to audio processing. However, an audio controller or audio processor is not necessarily a mixed signal circuit, and may include only analog domain components or only digital domain components. For example, a digital microphone may be used such that the input to the audio controller is a digital representation of sounds and analog domain components are not included in the audio controller. In this configuration, and others, the integrated circuit may have only digital domain components. One example of such a configuration is an audio controller having a digital signal processor (DSP). Regardless of the configuration for processing audio, the integrated circuit may include other components to provide supporting functionality. For example, the audio controller may include filters, amplifiers, equalizers, analog-to-digital converters (ADCs), digital-to-analog converters (DACs), a central processing unit, a graphics processing unit, a radio module for wireless communications, and/or a beamformer. The audio may be used in electronic devices with audio outputs, such as music players, CD players, DVD players, Blu-ray players, headphones, portable speakers, headsets, mobile phones, tablet computers, personal computers, set-top boxes, digital video recorder (DVR) boxes, home theatre receivers, infotainment systems, automobile audio, etc.

Figure 1A:
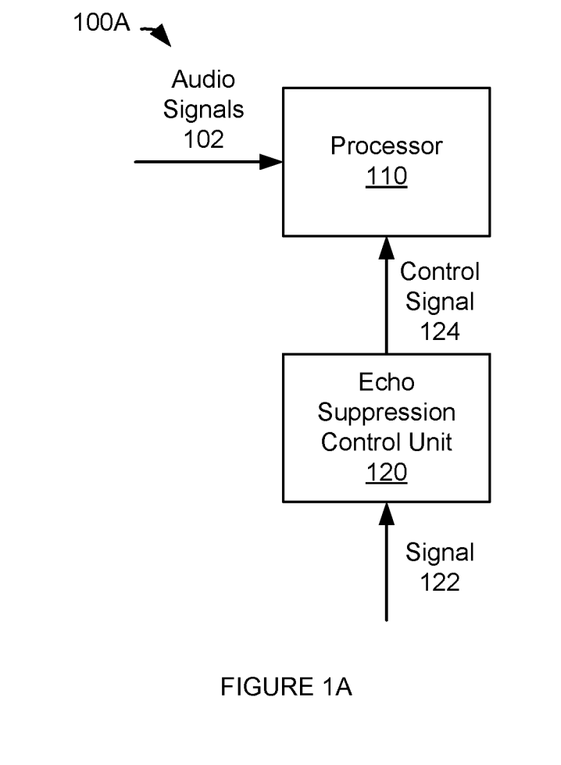
FIGS. 1A-1C show an example apparatus for controlling echo suppression in accordance with some embodiments.
Figure 1B:
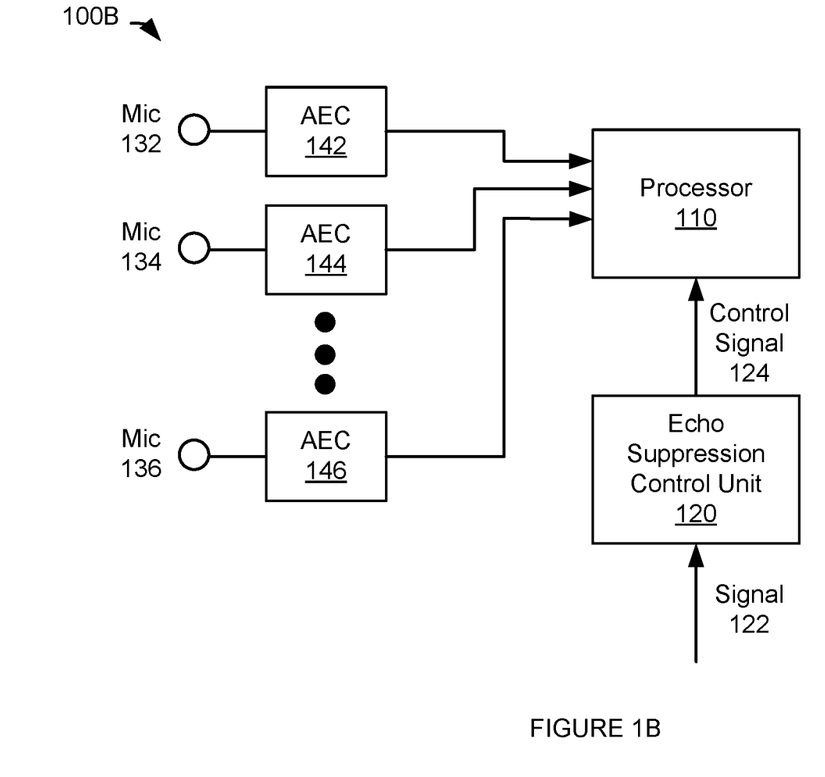
Figure 1C:
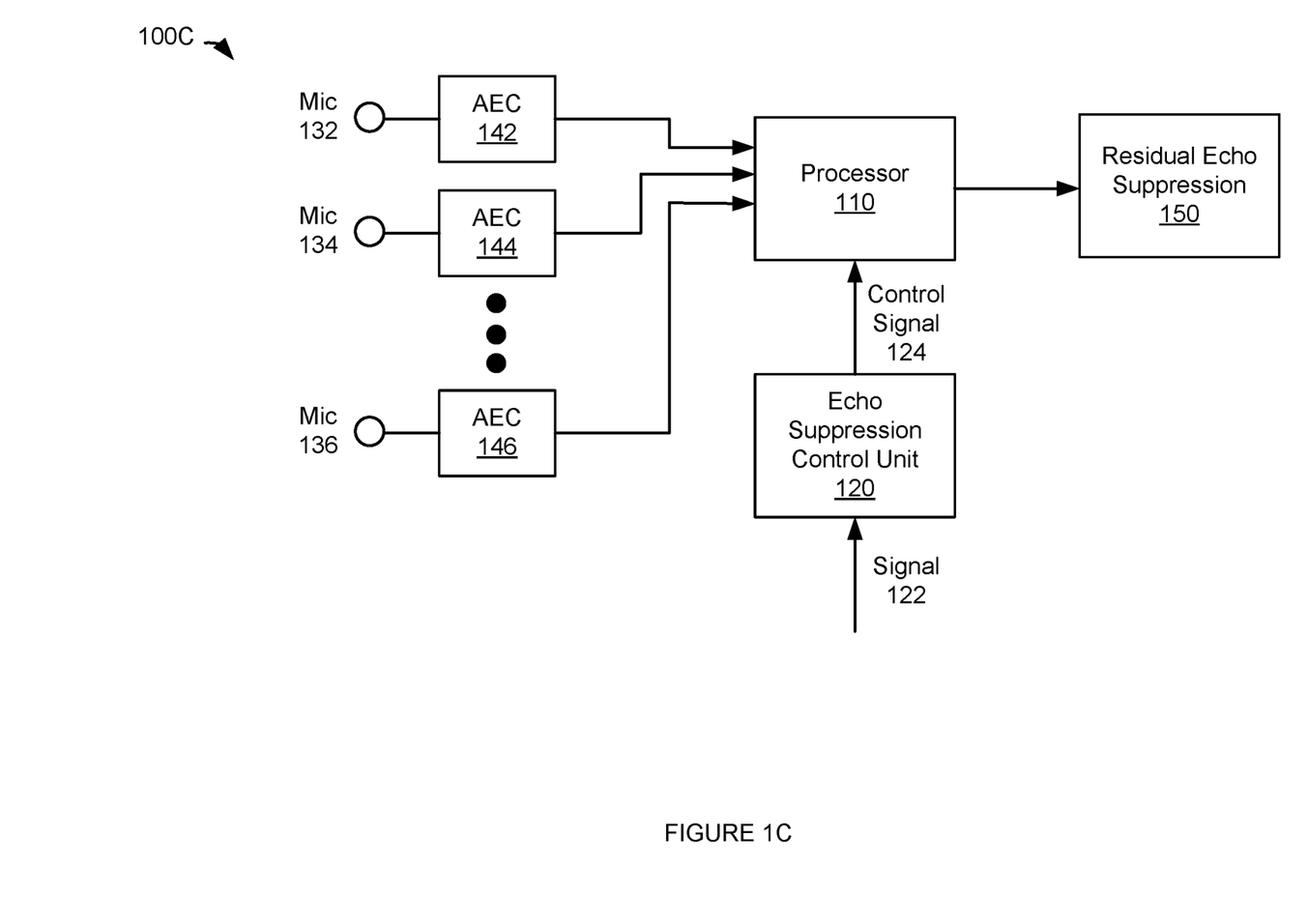

Referring now to FIGS. 1A-1C, an apparatus for achieving echo suppression in accordance with some embodiments is shown. Referring specifically to FIG. 1A, an apparatus 100A for achieving echo suppression in accordance with some embodiments is illustrated. Apparatus 100A includes a processor 110 and an echo suppression control unit 120. The processor 110 may be referred to as audio processor, a beamformer, or other types of processing units. It is appreciated that the processor 110 may receive audio signals 102, e.g., from an audio input such as microphones. It is further appreciated that even though one audio signal line is shown, the audio signals 102 may include multiple transmission lines.

In some embodiments, the processor 110 is configured to reduce echo in the received audio signals 102. For example, filters within the processor 110 may be used to reduce echo in the audio signals as the audio signals 102 are received. It is appreciated that the processor 110 may reduce echo continuously as it receives the audio signals 102.

According to some embodiments, the echo suppression control unit 120 is configured to determine whether the processor 110 should be dynamically adapted, e.g., by refining the filter (i.e. weights of the filter) used therein, to reduce echo. As such, the echo suppression control unit 120 determines whether the processor 110 should be dynamically adapted to reduce echo based on an input signal 122. The input signal 122 may be more than one signal and it may include 1) a Voice Activity Detection (VAD) control signal that determines whether near speech is present and dominating, 2) an Rx Active that may indicate whether any echo present is a dominating, 3) a signal that may indicate whether a trigger word has been detected, and 4) an adaptation freeze signal that may indicate to wait a certain period of time after detecting a trigger word before determining whether to dynamically adapt to echo. The echo suppression control unit 120 may control dynamic adaptation of the processor 110 via control signal 124, e.g., by providing step size and weights associated with the filter therein. It is appreciated that even though the embodiments are described with respect to certain number of components, e.g., one filter, etc., any number of components may be used.

It is appreciated that at any given time, the echo suppression control unit 120 may cause the processor 110 to dynamically adapt its speech blocking filter or echo suppression filter but not both at the same time.

In some embodiments, the echo suppression control unit 120 is configured to dynamically adapt the processor 110 to reduce echo if echo is dominating in the received audio signals 102. Echo may be determined to be dominating if echo is present and detected in the audio signals 102 for at least a certain period of time, e.g., 1 second, 2 seconds, etc., having at least a certain power that exceeds a threshold value. In some embodiments, the echo suppression control unit 120 may determine that the processor 110 should not be dynamically adapted in response to detecting that the system has just started up and that acoustic echo cancelers (not shown here) on the input to the processor 110 are rapidly adapting. Furthermore, in some embodiments, the echo suppression control unit 120 may determine that no dynamic adaptation is needed in response to detecting a trigger word. In some embodiments, the echo suppression control unit 120 may determine that the processor 110 should be dynamically adapted in response to detecting that echo is not dominating and further responsive to detecting near speech. Accordingly, the echo suppression control unit 120 may cause the processor 110 to be dynamically adapted to block the speech.

It is appreciated that in some embodiments, the echo suppression control unit 120 is a Multi-Mic Residual Echo Suppression (MMRES) and the processor 110 is a beamformer. The beamformer may be a Minimum Variance Distortionless Response (MVDR) beamformer or Generalized Sidelobe Canceller (GSC) in some embodiments. If MMRES determines that echo is to be further reduced, then it may cause the beamformer to be adapted to suppress the echo source (creating a null in the direction of the echo source). As discussed above, MMRES may act if there is persistent echo source that is interrupted occasionally by a near-end voice and/or command.

In some embodiments, the beamformer receives the audio signals 102 from multiple microphones and generates an output signal in the form of a selection and/or combination of the input signals. The output signal may for example be obtained from the input signals by applying different weightings and phasing to the audio signals 102. The beamformer may apply relative time delays to audio signals 102 received from the microphones. Signals from sound sources which are oriented such that the audio signals 102 arrive at the separate microphones with a certain relative time delay will reinforce when a compensating time delay is applied and the delayed signals are added. Signals from sound sources which are oriented such that the acoustic signals arrive at the separate microphones in antiphase with a certain time delay will cancel when a compensating time delay is applied and the delayed signals are added, thus providing a null response to sound sources so oriented. In some embodiments, some or all of the microphones may be designed with a deliberate directionality to supplement the directionality provided by the digital processing in order to aid reception of sounds from anticipated directions. In some embodiments, by utilizing the training algorithms with audio data from multiple microphones, speech sources may be identified and the beamformer's filters configured such that they enhance audio content from the direction of the loudest speech source and attenuate audio from other sources. It is appreciated that echo may similarly be identified and suppressed when desired.

Referring now to FIG. 1B, apparatus 100B is shown according to some embodiments. Apparatus 100B is substantially similar to that of FIG. 1A. In this embodiment, audio signals 102 are audio signals received from microphones 132, 134, . . . , 136. Microphones may include a micro-electro-mechanical system (MEMS) microphone, a digital microphone (DMIC), etc. The output audio signal may be encoded in a file format, such as MPEG-1 Layer 3 (MP3) or Advanced Audio Codec (AAC) and communicated over a network.

The audio signals received from the microphones 132-136 are then input to acoustic echo cancelers (AECs) 142, 144, . . . , 146 respectively. AECs 142-146 may adapt rapidly during startup to cancel echo. For example, AEC 142 may adapt rapidly during startup period to cancel (reduce) echo in the audio input channel associated with microphone 132. Similarly, AEC 144 may adapt rapidly during startup period to cancel (reduce) echo in the audio input channel associated with microphone 134. Moreover, AEC 146 may adapt rapidly during startup period to cancel (reduce) echo in the audio input channel associated with microphone 136.

Referring now to FIG. 1C, apparatus 100C is shown according to some embodiments. Apparatus 100C is substantially similar to that of FIG. 1B. In this embodiment, apparatus 100C may include a residual echo suppression (RES) 150 unit coupled to the output of the processor 110. The residual echo suppression 150 unit may be configured to further suppress echo present at the output of the processor 110 in response to the processor 110 being adapted to reduce echo.

It is appreciated that any number of components may be used in the illustrated embodiments. For example, any number of filters, any number of RESs, any number of AECs, any number of microphones, etc. may be used. As such, the number of components illustrated in each embodiment should not be construed as limiting the scope.

Figure 2:
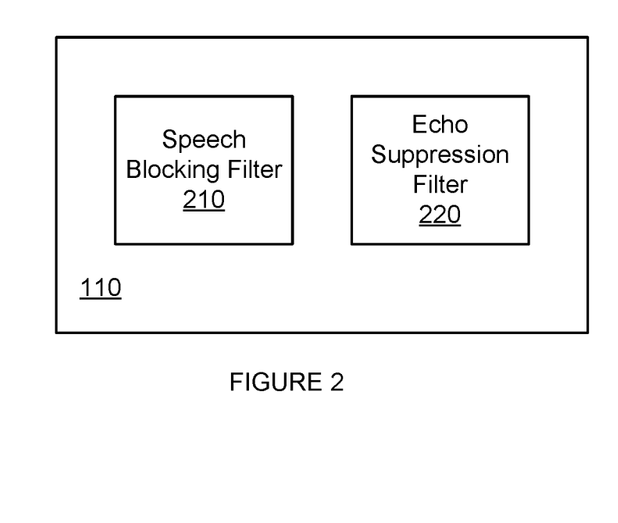
FIG. 2 shows an example processor in accordance with some embodiments.
Figure 5:
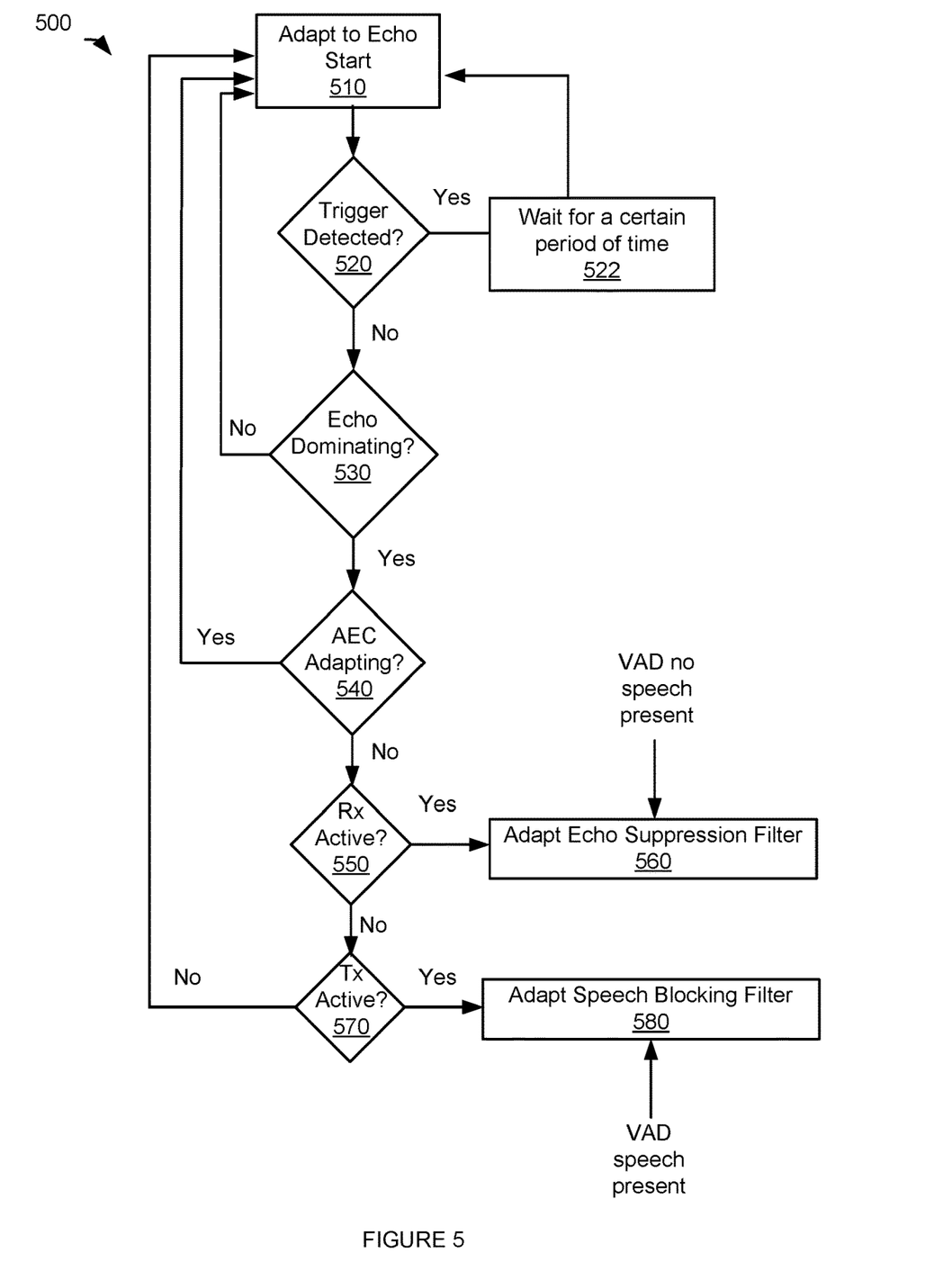
FIG. 5 shows an example flow diagram for controlling echo suppression in accordance with some embodiments.

Referring now to FIG. 2, a processor in accordance with some embodiments is shown. It is appreciated that the processor 110 may include a speech blocking filter 210 as well as an echo suppression filter 220. According to some embodiments, the speech blocking and echo suppression filters are sets of adaptive filters that allows a portion of the audio input signal to be passed through while blocking other portions of the audio input signal. For example, in some embodiments, the speech blocking filter 210 may block the near speech portion of the audio input and allow echo to pass through, such that the echo can subsequently be canceled from the audio input by a different component. In other words, the speech blocking filter 210 may be dynamically adapted when the echo suppression control unit 120 determines that near speech is dominant, the speech blocking filter 210 may be dynamically adapted to block speech. In contrast, when the echo suppression control unit 120 determines that echo is dominant, the echo suppression filter 220 may be dynamically adapted in order to suppress echo. One example of the decision tree for the echo suppression control unit 120 is shown in FIG. 5, discussed below.

It is appreciated that the echo suppression control unit 120 may determine the step size associated with the speech blocking filter 210 or the echo suppression filter 220 when it determines whether speech is to be blocked or echo is to be suppressed, respectively. In some embodiments, a coherence (normalized cross correlation) statistic is calculated to determine the step size if the speech blocking filter 210 or the echo suppression filter 220 is to be adapted. This coherence is frequency based and is the magnitude-squared coherence between the input and output signals of the RES 150, and is low when echo is dominating in comparison to near speech and high when near speech is dominating in comparison to echo. In some embodiments, the step size determined for the echo suppression filter 220 is inversely related to the coherence as shown below.

$$\mu_{SLC(\omega)} = min\left(\frac{C}{|\Gamma(\omega)|^2}, \mu_{max}\right)$$

Step size $\mu_{SLC}$ of the echo suppression filter 220 reflects the speed with which the echo suppression filter 220 adapts, per frequency bin, e.g., different step size for different frequencies $\omega$. The coherence as determined is $\Gamma(\omega)$, and C is a constant that governs the relationship between coherence and the step size. As presented above, the echo suppression control unit 120 determines a large step size for the echo suppression filter when echo is present and dominating in comparison to near speech (low coherence between the input and output signals of the RES 150). The step size is limited to a maximum value to prevent the filter from becoming unstable. Similarly, in some embodiments, the step size determined for the speech blocking filter 210 may be directly related to the coherence as shown below.

$$\mu_{ABM(\omega)} = min(C \cdot |\Gamma(\omega)|^2, \mu_{max})$$

Step size $\mu_{ABM}$ of the speech blocking filter 210 reflects the speed with which the speech blocking filter 210 adapts, per frequency bin. The echo suppression control unit 120 determines a large step size for the speech blocking filter when near speech is present and dominating in comparison to echo (high coherence between the input and output signals of the RES 150). The step size is limited to a maximum value to prevent the filter from becoming unstable.

Figure 3:
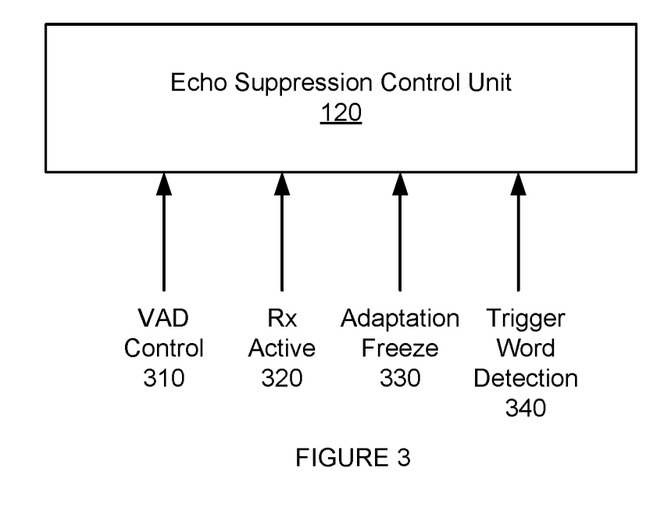
FIG. 3 shows an example echo suppression control unit in accordance with some embodiments.

Referring now to FIG. 3, an echo suppression control unit in accordance with some embodiments is shown. The input signal to the echo suppression control unit 120 may be the VAD control 310 signal, Rx Active 320 signal, Adaptation Freeze 330 signal, and the Trigger Word Detection 340 signal, as discussed above.

Figure 4A:
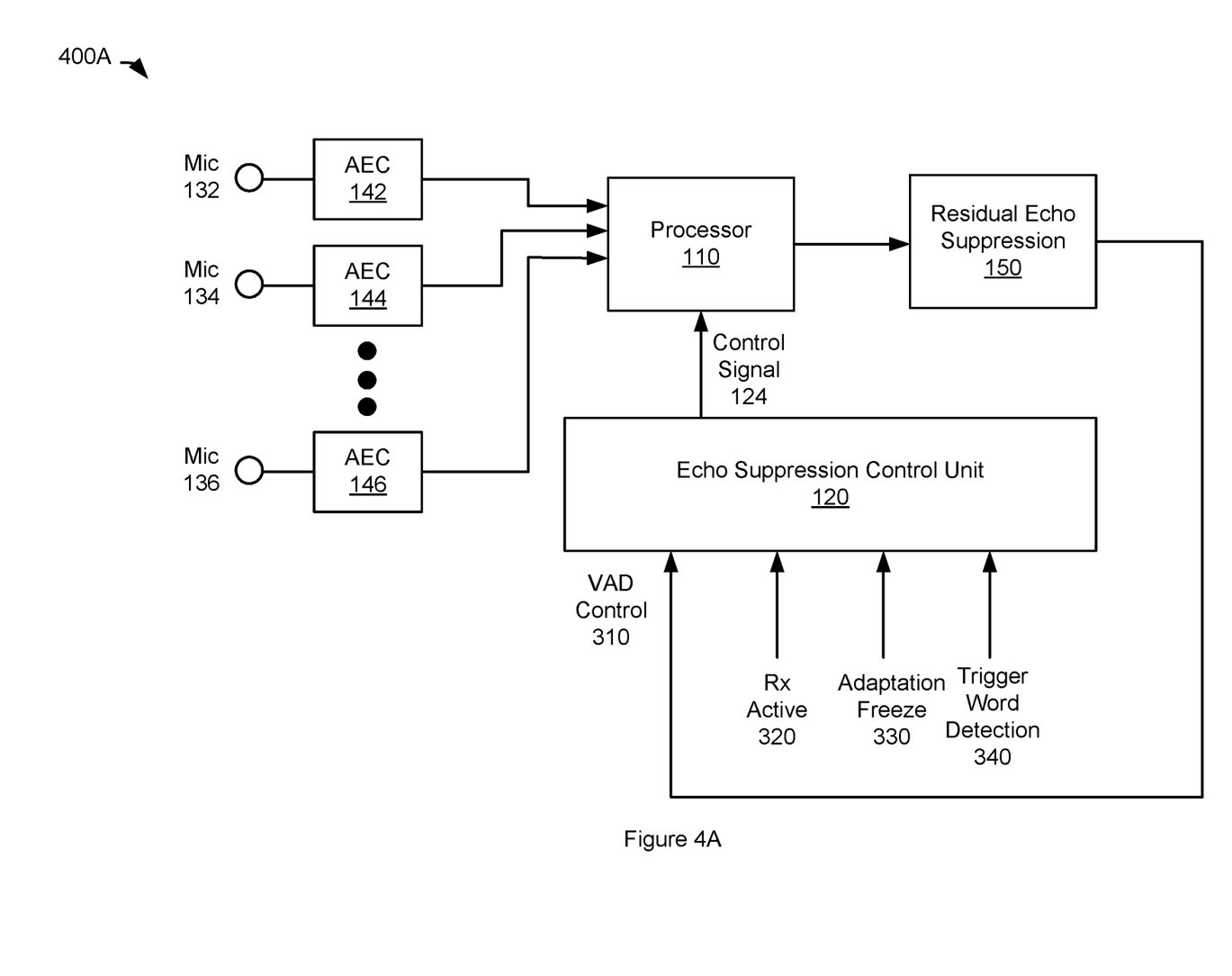
FIGS. 4A-4B show two example configurations of an apparatus for controlling echo suppression in accordance with some embodiments.
Figure 4B:
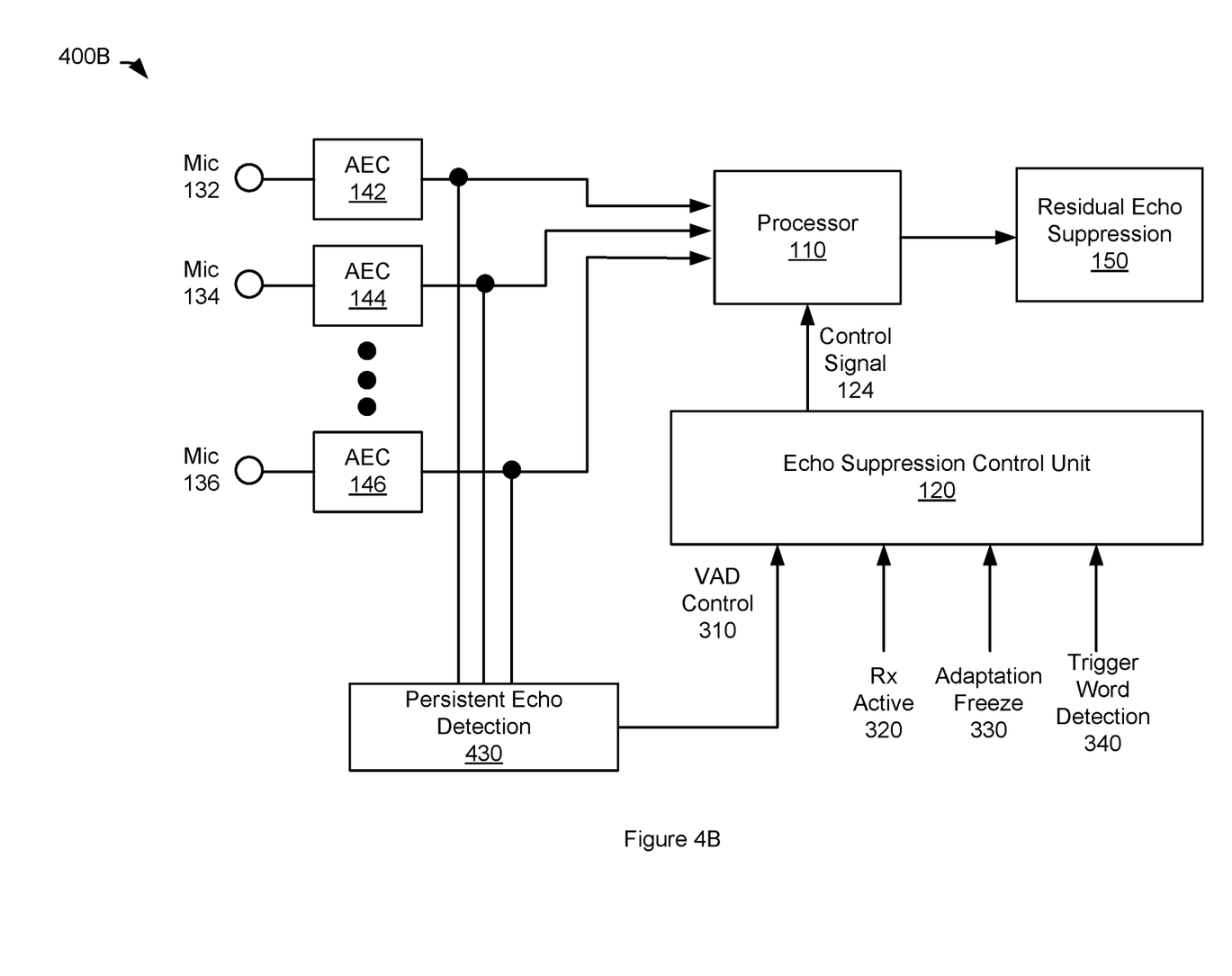

Referring now to FIGS. 4A-4B, two configurations of an apparatus for achieving echo suppression in accordance with some embodiments are shown. Referring specifically to FIG. 4A, an apparatus 400A similar to that described as apparatus 100C in FIG. 1C along with the echo suppression control unit 120 in FIG. 3, is shown. In this embodiment, the VAD control 310 signal is an output from the residual echo suppression 150 and it is input to the echo suppression control unit 120. The VAD control 310 signal may determine whether near speech or echo is present and dominating based on the output of the residual echo suppression 150. The VAD control 310 signal may be generated based on the coherence between the input to the residual echo suppression 150 and its output. For example, if the coherence is high, the VAD control 130 signal may be set to indicate that near speech is dominant and if the coherence is low, the VAD control 130 signal may be set to indicate that echo is dominant. The VAD control 130 signal, along with the Rx Active 320 signal, Adaptation Freeze 330 signal, and the Trigger word detection 340 signal may be used by the echo suppression control unit 120 to determine whether the processor 110 should be dynamically adapted to block speech, dynamically adapted to reduce echo, or not to be adapted at all. A more detailed description of the decision tree to determine whether to adapt the processor 110 is given with respect to FIG. 5 below.

Referring now to FIG. 4B, an apparatus 400B according to some embodiments is shown. The apparatus 400B is substantially similar to that of FIG. 4A except that the VAD control 310 signal is received from a persistent echo detector 430. The persistent echo detector 430 is coupled to the output of the AECs 142, 144, . . . , 146. According to some embodiments the persistent echo detector 430 is configured to use the audio signals from two or more microphones, e.g., microphone 132, 134, , , , , 136, to detect interference sources base on spatially stationary. It is appreciated that the persistent echo detector 430 may be used to differentiate between echo and near-end talker speech. In some embodiments, echo arrives from a source, e.g., playback loudspeaker, that is at the same fixed spatial location relative to the microphones 132-136. Thus, spatial stationarity of the echo signal (persistence) may be used as a detection statistic to determine whether echo is present, because near-end talker speech, e.g., a real human talker, is not expected to remain stationary. An example of spatial detection of interference sources is described in patent application Ser. No. 15/714,190 that was filed on Sep. 25, 2017, which is incorporated herein by reference in its entirety. Persistent interference detection is described in more detail below.

Many interference sources encountered in smart home environments may be characterized as persistent interference sources. Persistent interference sources are those that recur from a fixed spatial location relative to the device, which is also fixed. Some examples of such interference sources may include TVs, music systems, air-conditioners, washing machines, dishwashers, microwave ovens, and playback loudspeakers. In contrast, real human talkers are not expected to remain stationary and speak continuously from the same position for a long time. From the device's perspective, the sound from a persistent interference source generally arrives from the same direction over time, but sound from a desired talker generally changes directions over time. Thus, over time, the acoustic sources that arrive repeatedly from fixed directions may be identified as persistent interference sources.

This observation regarding the persistence of interference sources may be used to distinguish persistent interference sources, e.g., echo signals, from desired talkers. In some embodiments, a method for detecting persistent interference sources may include receiving audio data from a microphone array, e.g., microphones 132-136, with two microphones placed at a fixed location in the environment. Multiple time periods of audio data may be recorded in the first and second microphone signals. An acoustic source may be identified as a persistent interference source when the source is determined to be generally originating from the same spatial location with respect to the microphone array over several time periods. Persistent interference sources generally appear as acoustic sources with approximately constant inter-microphone frequency-dependent phase profiles. In contrast, human talkers generally appear as acoustic sources with changing inter-microphone frequency-dependent phase profiles.

The persistence of acoustic sources may be tracked using the inter-microphone frequency-dependent phase profile for the microphones on the array. The inter-microphone frequency-dependent phase profile is related to the timing difference between the audio signals as governed by the sound propagation from an acoustic source to the microphones, e.g., microphones 132-136, (including the direct path, room reverberation, and diffraction effects). The inter-microphone frequency-dependent phase profile captures the acoustic path from the source to that microphone pair in the environment, e.g., room. When the microphone array includes three or more microphones, the acoustic source identification may be based on the inter-microphone frequency-dependent phase profile from multiple pairs of microphones. The inter-microphone frequency-dependent phase profile may be calculated for any pair of microphones and any number of microphone pairs. A persistent interference detection statistic may then be computed to differentiate between near speech and persistent interference based on the similarity between the instantaneous inter-microphone frequency-dependent phase profile and the learned historically recurring inter-microphone frequency-dependent phase profiles. A high degree of similarity with a learned persistent interference inter-microphone frequency-dependent phase profile indicates that the acoustic source is a persistent interference source. Echo originates from a playback loudspeaker that is stationary with respect to the microphone array and is detected as a persistent interference source. Accordingly, the VAD control 310 signal may be generated that indicates whether near-talker is present or echo is present.

Additionally, the inter-microphone frequency-dependent phase profile may be used in far-field audio processing to improve voice quality and automatic speech recognition performance in high echo-to-near ratio environments. The detected echo interference sources may be excluded from automatic speech recognition processing to prevent accidental triggering of commands. The detection of the echo interference sources may also be used to filter out the detected echo interference from the microphone signals to improve the recognition of desired speech. It is appreciated that other information regarding the environment may also be obtained from the multiple-microphone signals, e.g., microphones 132-136. For example, the microphone signals may be processed to infer the locations of talkers. Accordingly, far-field audio processing may be used to enhance the performance of audio devices.

Referring now to FIG. 5, a flow diagram 500 for achieving echo suppression in accordance with some embodiments is shown. At step 510, the process to determine whether to adapt to echo, e.g., echo suppression, starts. At step 520, it is determined whether a trigger word is detected. If a trigger word is detected, then the process waits for a certain period of time, at step 522, because it is assumed that there will be playback for a certain period of time. For example, the process waits for three (3) seconds and returns to the start, at step 510. The beamformer may not be adapted unless there is constant playback, e.g., when music is played.

It is determined whether the echo signal is dominating, at step 530 if no trigger word is detected. For example, the echo signal may be determined to be dominating if the signal strength exceeds a certain threshold for a certain period of time, e.g., two (2) seconds. If the echo signal is not dominating then the process may return back to step 510. The VAD signal may be used to determine whether echo is dominating. If the echo signal is dominating, then at step 540 it may be determined whether AECs are adapting at a rapid pace. Rapid adaptation by the AEC components may indicate that the apparatus has just started up. If AECs are adapting rapidly, then the process may return back to step 510. However, if the AECs are stable and not rapidly adapting, then it is determined whether Rx Active signal is active, at step 550, which indicates whether echo is dominating. In response to determining that the Rx Active signal is asserted, the SLC of the processor may be dynamically adapted to further reduce the residual echo portion of the received audio signals. In other words, when Rx Active signal is asserted, it is determined that no speech or very little speech is present. If the Rx Active signal is not asserted, then it is determined whether Tx signal is active and asserted, at step 570. Tx signal indicates whether near talk or speech is present. If near talk or speech is present, then at step 580, the speech blocking filter is dynamically adapted to block near speech, however, if near talk or speech is not present, the process returns to step 510 without adapting.

Figure 6A:
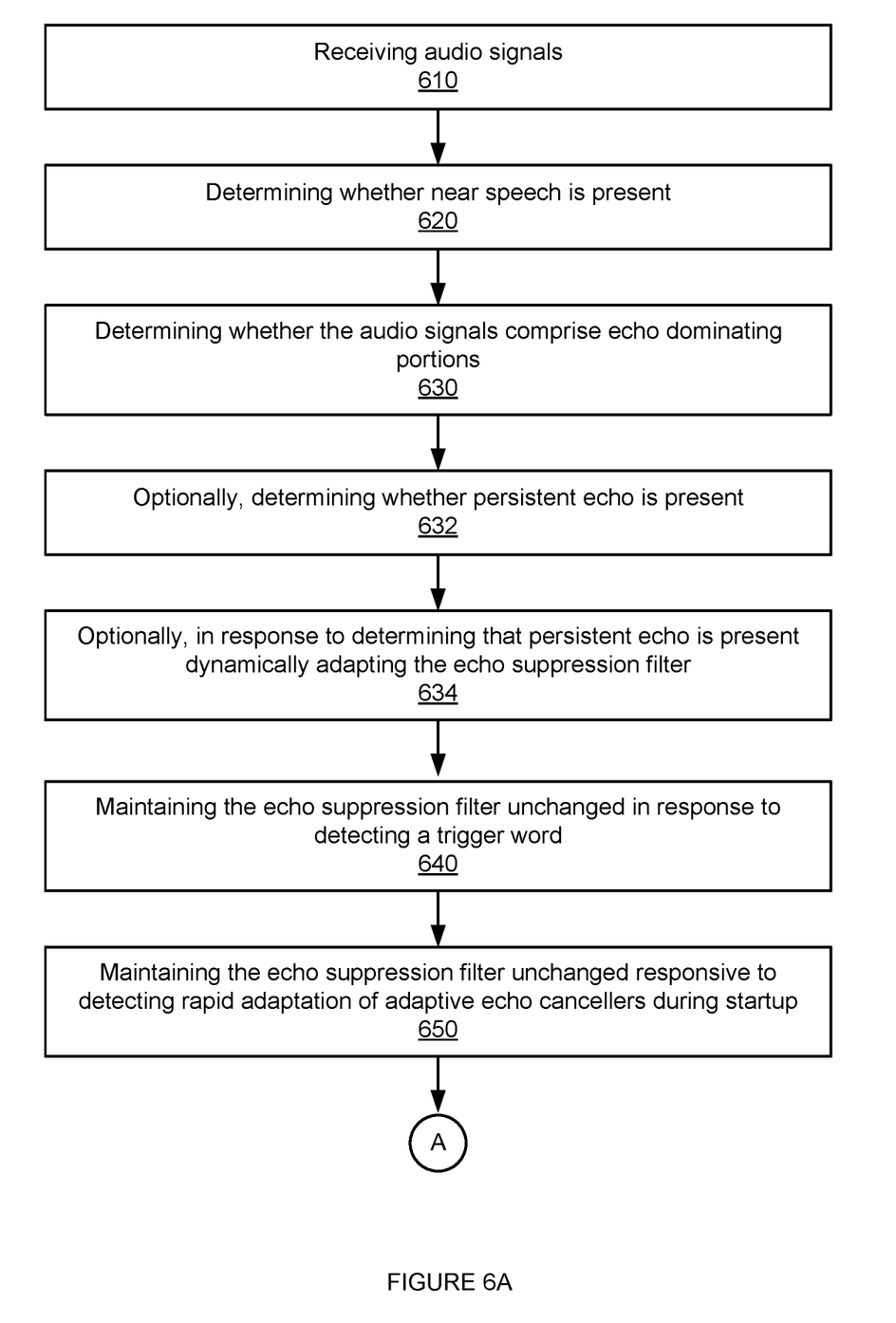
FIG. 6A-B shows an example flow diagram for controlling echo suppression of a device in accordance with some embodiments.
Figure 6B:
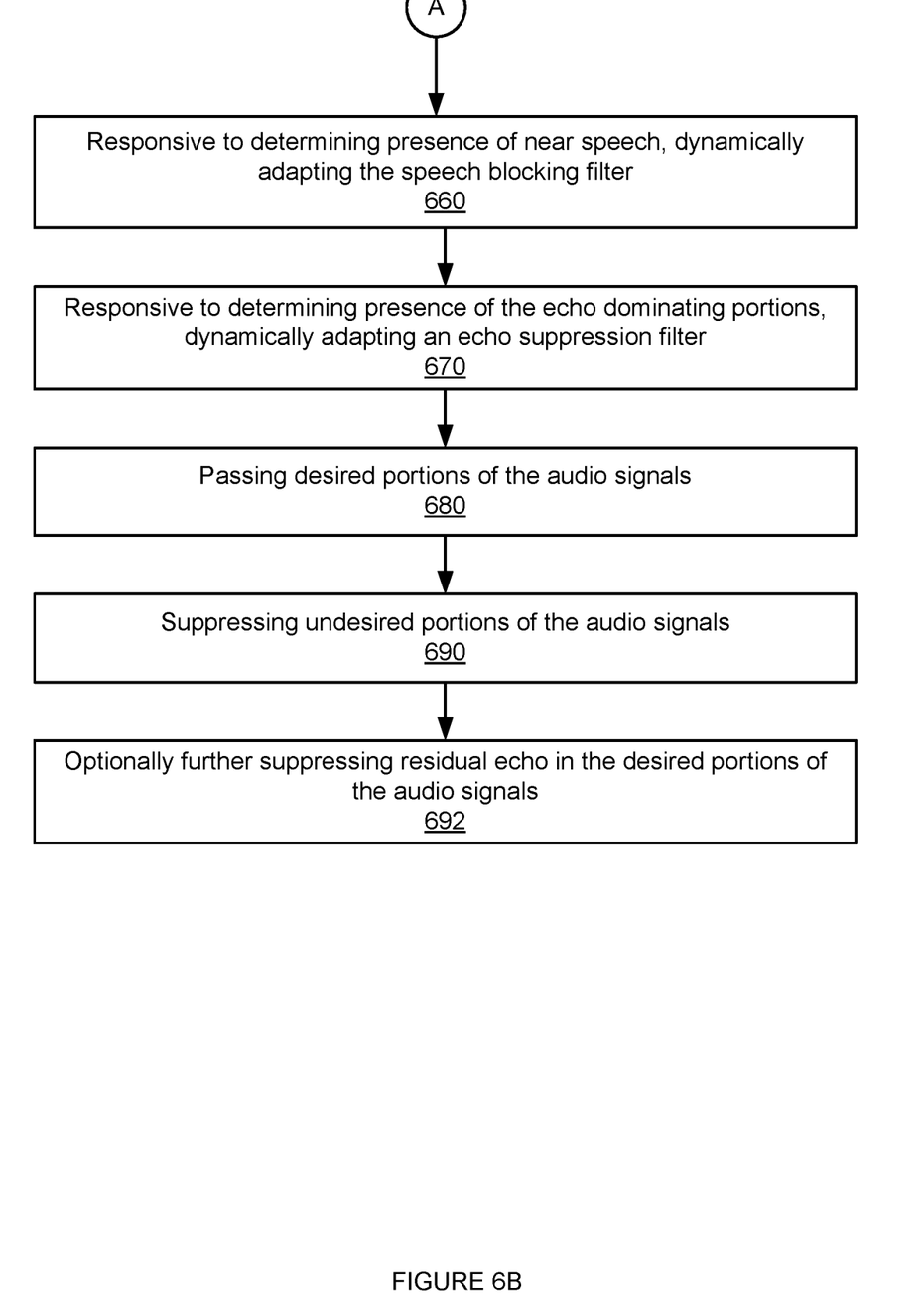

Referring now to FIG. 6, a flow diagram 600 for controlling echo suppression of a device in accordance with some embodiments is shown. At step 610, audio signals are received. At step 620, it is determined whether near speech is present, e.g., VAD signal may be used. At step 630, it is determined whether the audio signals include echo dominating portions. It is appreciated that in some optional embodiments, at step 632, it may be determined whether a persistence echo is present, and if so, then the processor and filter therein, e.g., echo suppression filter such as SLC, may be dynamically adapted to further suppress echo, at step 634. In some embodiments, at step 640, the echo suppression filter may be maintained and unchanged, hence not adapted, if a trigger word is detected. At step 650, the echo suppression filter is maintained and unchanged responsive to detecting rapid adaptation by AECs, indicating that the apparatus just started up or that the direction was just changed.

At step 660, responsive to determining that near speech is present, the speech blocking filter may be dynamically adapted to block near speech. It is appreciated that near speech may be detected in response to detecting presence of near speech dominating portion, in some embodiments. At step 670, in response to determining presence of the echo dominating portions, the echo suppression filter may be dynamically adapted to suppress echo. It is appreciated that adapting the echo suppression filter may be in response to detecting that playback is active, in some embodiments. At step 680, a desired portion (near speech) of the audio signals is passed and the undesired portions (echo) of the audio signals may be suppressed at step 690. Optionally, the residual echo present in the output of the audio signals may be further suppressed, e.g., through using residual echo suppression.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. An apparatus comprising:
a beamformer configured to pass desired portions of audio signals received using two or more microphones and further configured to suppress undesired portions of the audio signals, wherein the beamformer comprises a speech blocking filter to prevent suppression of near-end desired talker speech in the audio signals and further comprises an echo suppression filter to suppress echo from the audio signals;
an echo suppression control unit coupled to the beamformer, wherein the echo suppression control unit is configured to receive a signal and determine whether to dynamically adapt the speech blocking filter or to dynamically adapt the echo suppression filter, wherein the speech blocking filter remains unchanged during dynamic adaptation of the echo suppression filter and wherein the echo suppression filter remains unchanged during dynamic adaptation of the speech blocking filter; and
a residual echo cancellation unit coupled to the beamformer, wherein the residual echo cancellation unit is configured to receive output audio signals from the beamformer and to further suppress residual echo in the output audio signals.

2. The apparatus as described by claim 1 further comprising a persistent interference detector configured to receive the audio signals and further configured to detect presence of persistence echo, and wherein the persistent interference detector is configured to generate a signal indicating whether a persistent echo is present, and wherein the signal is input to the echo suppression control unit that determines whether to dynamically adapt either the speech blocking filter or the echo suppression filter responsive to the signal.

3. The apparatus as described by claim 1, wherein the signal is an output signal from the echo cancellation unit.

4. The apparatus as described by claim 1 further comprising a plurality of acoustic echo cancelers (AECs) coupled to an input of the beamformer, wherein the plurality of AECs is configured to reduce echo in the audio signals at the inputs of the beamformer by reducing power thereof.

5. The apparatus as described by claim 4, wherein the echo suppression control unit is configured to maintain the echo suppression filter unchanged during startup of the apparatus, wherein the plurality of AECs adapt rapidly during the startup, and wherein the echo suppression control unit is configured to cause the beamformer to dynamically adapt the speech blocking filter during the startup of the apparatus if near speech is detected.

6. The apparatus as described by claim 1, wherein the echo suppression control unit is configured to maintain the echo suppression filter unchanged in response to detecting a trigger-word.

7. The apparatus as described by claim 1, wherein the echo suppression control unit is configured to cause the echo suppression filter to dynamically adapt in response to detecting that the received audio signals comprise an echo dominating portion and further responsive to detecting that playback is active.

8. The apparatus as described by claim 1, wherein the echo suppression control unit is configured to cause the beamformer to dynamically adapt the speech blocking filter in response to detecting near speech and further in response to detecting presence of near speech dominating portion in the received audio signals.

9. An apparatus comprising:
a processor comprising a first filter and a second filter, wherein the processor is configured to receive audio signals from two or more microphones and wherein the processor is configured to suppress undesired portions of the audio signals and to pass desired portions of the audio signals; and
an echo suppression control unit configured to receive a signal and determine whether to dynamically adapt the first filter to prevent suppression of near-end desired talker speech in the received audio signals or the second filter to suppress echo in the received audio signals, wherein the second filter remains unchanged during dynamic adaptation of the first filter and wherein the first filter remains unchanged during dynamic adaptation of the second filter.

10. The apparatus as described by claim 9, wherein the first filter of the processor is a speech blocking filter and wherein the second filter of the processor is an echo suppression filter.

11. The apparatus as described by claim 9 further comprising a plurality of acoustic echo cancelers (AECs) coupled to the input of the processor, wherein the plurality of AECs is configured to reduce echo in the audio signals at the inputs of the processor by reducing power thereof.

12. The apparatus as described by claim 11, wherein the echo suppression control unit is configured to maintain the second filter of the processor unchanged during startup of the apparatus, wherein the plurality of AECs adapt rapidly during the startup, and wherein the echo suppression control unit is configured to cause the processor to dynamically adapt the first filter of the processor during the startup of the apparatus if near speech is detected.

13. The apparatus as described by claim 9, wherein the echo suppression control unit is configured to maintain the second filter of the processor unchanged in response to detecting a trigger word.

14. The apparatus as described by claim 9, wherein the echo suppression control unit is configured to cause the second filter of the processor to dynamically adapt in response to detecting that the received audio signals comprise an echo dominating portion and further responsive to detecting that a signal associated with playback is active.

15. The apparatus as described by claim 9, wherein the echo suppression control unit is configured to cause the first filter of the processor to dynamically adapt in response to detecting near speech and further in response to detecting presence of near speech dominating portion in the received audio signals.

16. A method comprising:
receiving audio signals using two or more microphones;
determining whether near speech is present;
determining whether the audio signals comprise echo dominating portions;
responsive to determining presence of the near speech, dynamically adapting a speech blocking filter;
responsive to determining presence of the echo dominating portions, dynamically adapting an echo suppression filter, wherein the speech blocking filter remains unchanged during adaptation of the echo suppression filter and wherein the echo suppression filter remains unchanged during adaptation of the speech blocking filter;
passing desired portions of the audio signals; and
suppressing undesired portions of the audio signals.

17. The method as described by claim 16 further comprising further suppressing residual echo in the audio signals.

18. The method as described by claim 16 further comprising determining whether persistent echo is present and in response to determining that persistent echo is present dynamically adapting the echo suppression filter.

19. The method as described by claim 16 further comprising:
maintaining the echo suppression filter unchanged responsive to detecting rapid adaptation of acoustic echo cancelers during startup; and
responsive to determining presence of near speech, dynamically adapting the speech blocking filter.

20. The method as described by claim 16 further comprising maintaining the echo suppression filter unchanged in response to detecting a trigger word.

21. The method as described by claim 16 further comprising dynamically adapting the echo suppression filter in response to detecting that the received audio signals comprise an echo dominating portion and further responsive to detecting that playback is active.

22. The method as described by claim 16 further comprising dynamically adapting the speech blocking filter in response to detecting near speech and further in response to detecting presence of near speech dominating portion in the received audio signals.

* * * * *